US012650364B2

(12) United States Patent
Clark et al.

(10) Patent No.: US 12,650,364 B2
(45) Date of Patent: Jun. 9, 2026

(54) SYSTEM AND METHOD OF NON-PRESSURIZED SAMPLE CONVEYANCE

(71) Applicant: BL TECHNOLOGIES, INC., Minnetonka, MN (US)

(72) Inventors: Brett M. Clark, Berthoud, CO (US); Paul Fusco, Huntington Station, NY (US)

(73) Assignee: BL TECHNOLOGIES, INC., Minnetonka, MN (US)

( * ) Notice: Subject to any disclaimer, the term of this patent is extended or adjusted under 35 U.S.C. 154(b) by 284 days.

(21) Appl. No.: 18/277,678

(22) PCT Filed: Feb. 16, 2022

(86) PCT No.: PCT/US2022/016519
§ 371 (c)(1),
(2) Date: Aug. 17, 2023

(87) PCT Pub. No.: WO2022/177933
PCT Pub. Date: Aug. 25, 2022

(65) Prior Publication Data
US 2024/0133775 A1    Apr. 25, 2024
US 2024/0230480 A9    Jul. 11, 2024

Related U.S. Application Data

(60) Provisional application No. 63/150,274, filed on Feb. 17, 2021.

(51) Int. Cl.
*G01N 1/20* (2006.01)

(52) U.S. Cl.
CPC ..... *G01N 1/2035* (2013.01); *G01N 2001/205* (2013.01)

(58) Field of Classification Search
CPC .. G01N 1/2035; G01N 2001/205; G01N 1/16; G01N 2001/2064; G01N 1/10; G01N 1/18

(Continued)

(56) References Cited

U.S. PATENT DOCUMENTS

| | | | |
|---|---|---|---|
| 5,132,094 A | | 7/1992 | Godec et al. |
| 5,400,665 A | * | 3/1995 | Zhu .......................... H05H 1/42 |
| | | | 73/864.81 |

(Continued)

FOREIGN PATENT DOCUMENTS

| | | |
|---|---|---|
| CN | 203069542 U | 7/2013 |
| CN | 111250488 A | 6/2020 |
| CN | 111579622 A | 8/2020 |

OTHER PUBLICATIONS

Communication Pursuant to Article 94(3) EPC for European Application No. 22707306.1, dated Jan. 23, 2025, 11 Pages.

(Continued)

*Primary Examiner* — John E Breene
*Assistant Examiner* — Truong D Phan
(74) *Attorney, Agent, or Firm* — Meunier Carlin & Curfman LLC

(57) ABSTRACT

Various implementations include a system and methods for capture and transfer of a liquid sample from a process to a sample analysis device. In particular, a sample of fluid can be contained in a non-pressurized line and first and second air-operated valves may prevent the fluid from flowing through the line. A third air-operated valve may be positioned on a stub-out of the non-pressurized line between the first and second air-operated valves. A sample line, also configured to contain a sample of the fluid, can extend between the third air-operated valve and a sample analysis device to transfer the sample of fluid to the sample analysis device. A first pneumatic valve can control air flow to the (Continued)

first and second air-operated valves; a second pneumatic valve can control air flow to the third air-operated valve; and a third pneumatic valve can control low-pressure air injected into the sample line.

17 Claims, 15 Drawing Sheets

(58) Field of Classification Search
USPC ....... 73/863, 61.55–61.56, 220, 61.68, 61.59
See application file for complete search history.

(56) References Cited

U.S. PATENT DOCUMENTS

| | | | | |
|---|---|---|---|---|
| 5,487,313 A | * | 1/1996 | Johnson | G01N 35/1097 |
| | | | | 73/864.83 |
| 5,902,751 A | | 5/1999 | Godec et al. | |
| 6,036,923 A | * | 3/2000 | Laugharn, Jr. | C12N 9/00 |
| | | | | 435/6.12 |
| 9,074,967 B2 | | 7/2015 | Clay | |
| 9,442,047 B2 | | 9/2016 | Biksacky | |
| 2010/0058843 A1 | * | 3/2010 | Fries | G01N 1/2035 |
| | | | | 73/61.59 |
| 2019/0212233 A1 | * | 7/2019 | Jovanovich | C12N 1/06 |
| 2024/0133775 A1 | * | 4/2024 | Clark | G01N 1/2035 |

OTHER PUBLICATIONS

Office Action for Taiwan Application No. 111104922, dated May 21, 2025, 13 pages.
International Search Report and Written Opinion from corresponding International Patent Application No. PCT/US2022/016519, mailed on May 24, 2022.
Office Action in connection to JP Application No. 2023-549041, dated Dec. 25, 2025.
Office Action in connection to CN Application No. 202280015036, dated Mar. 24, 2026.

* cited by examiner

SYSTEM AND METHOD OF NON-PRESSURIZED SAMPLE CONVEYANCE

CROSS-REFERENCE TO RELATED APPLICATIONS

The present application is a § 371 National Stage of International Application No. PCT/US2022/016519, filed Feb. 16, 2022, which claims priority to and the benefit of U.S. Provisional Patent Application No. 63/150,274, filed Feb. 17, 2021, both of which are incorporated herein by reference in their entries.

BACKGROUND

Disclosed and described herein are systems and methods for capturing and conveying a non-pressurized liquid sample from a validated pharmaceutical process or piece of equipment to an instrument for online/real time analysis.

In some processes, various components of the process must be cleaned between runs of products produced by the process or on a regular basis. These components may include, for example, tanks, pipes, boilers, reactors, and other vessels and the like. Often, a clean-in-place ("CIP") skid is used during this cleaning process (see FIG. 1 for an example of a CIP skid) and the effluent from the cleaning process may be sampled during the cleaning process to analyze for various contaminants and/or product residue remaining in the process components. The effluent may be sampled from a pressurized line or from an unpressurized line, for example, a drain line. In some instances, fluids from the cleaning process are introduced to a sampler, and the sampler provides a sample of the cleaning fluids to an analyzer. An exemplary sampler is shown and described in U.S. Pat. No. 9,074,967, filed Dec. 20, 2012, and co-pending U.S. Provisional Patent Application No. 63/150,258, filed Feb. 17, 2021, both of which are fully incorporated by reference and made a part hereof.

In other instances, fluids from the cleaning process may be provided directly to an analyzer. Analyzers are used to examine the effluent for various contaminants and/or product residue. Such analyzers may include, for example, total organic carbon ("TOC") analyzers. TOC analyzers are used for, among other purposes, cleaning validation of systems containing organic carbon. Descriptions of TOC analyzers can be found in U.S. Pat. No. 5,132,094, filed Mar. 2, 1990, and U.S. Pat. No. 5,902,751, filed Feb. 10, 1997, both of which are incorporated herein by reference in their entireties. For example, a TOC may be used to test liquids used in cleaning equipment used various processes, including, for example, in a pharmaceutical process.

Pharmaceutical process equipment cleaning requires sampling and testing of liquid solutions for residual drug components and cleaning agents. Online or real time testing is preferred for minimizing cycle times and equipment down time. Many devices and methods may be used to introduce the liquid sample to the testing instrument, including pumps and valves. However, ease of implementation and validation decreases with increased complexity. A critical requirement is to avoid dead volumes and fluid accumulation that can promote biological growth and impact test results.

Therefore, what is needed is a method to convey the non-pressurized sample that does not change the results, does not require pumps or other mechanical systems that increase risk of failure and automation complexity, and provides a way to remove any residual fluid in the sampling line.

SUMMARY

The present disclosure relates to apparatuses, systems, and methods for conveying a non-pressurized liquid sample from a first process or piece of equipment to an instrument for online/real time analysis of the liquid sample.

One implementation of the present disclosure is a system for non-pressurized sample transfer. The system includes a non-pressurized liquid line, wherein the non-pressurized liquid line is configured to contain a fluid to be sampled; a first air-operated diaphragm valve and a second air-operated diaphragm valve in the liquid line, wherein closing either the first air-operated diaphragm valve and/or the second air-operated diaphragm valve prevents flow of the fluid to be sampled through the non-pressurized liquid line; a third air-operated diaphragm valve situated on a stub-out of the non-pressurized liquid line, wherein the stub-out is located between the first air-operated diaphragm valve and the second air-operated diaphragm valve; a sample line having a first end and a second end, wherein the first end if connected to the third air-operated diaphragm valve and the second end is connected to a sample analysis device, wherein the sample line is configured to contain and transfer a sample of the fluid to be sampled to the sample analysis device; a first pneumatic valve that controls air flow to the first air-operated diaphragm valve and the second air-operated diaphragm valve; a second pneumatic valve that controls air flow to the third air-operated diaphragm valve; and a third pneumatic valve that controls low-pressure air injected into the sample line.

In some embodiments, the first air-operated diaphragm valve and the second air-operated diaphragm valve are closed by the first pneumatic valve supplying or removing pressurized air to the first air-operated diaphragm valve and the second air-operated diaphragm valve, said first air-operated diaphragm valve and second air-operated diaphragm valve closed when the fluid to be sampled is contained in the non-pressurized liquid line so that a portion of the fluid to be sampled is trapped between the first air-operated diaphragm valve and the second air-operated diaphragm valve; the third air-operated diaphragm valve remains open or is opened by the second pneumatic valve supplying or removing pressurized air to the third air-operated diaphragm valve and at least a portion of the trapped portion of the fluid to be sampled enters the sample line; the third air-operated diaphragm valve is closed by the second pneumatic valve supplying or removing pressurized air to the third air-operated diaphragm valve; the third pneumatic valve is opened and the low-pressure air is injected into the sample line; and the low-pressure air injected into the sample line moves the portion of the fluid to be sampled in the sample line to the sample analysis device.

In some embodiments, the third air-operated diaphragm valve is closed by the second pneumatic valve supplying or removing pressurized air to the third air-operated diaphragm valve before the third pneumatic valve is opened and the low-pressure air is injected into the sample line.

In some embodiments, the non-pressurized liquid line is a drain line.

In some embodiments, the non-pressurized liquid line connects one component of a process to another component of a process.

In some embodiments, the non-pressurized liquid line is part of a clean-in-place (CIP) skid.

In some embodiments, the system is part of the CIP skid.

In some embodiments, the system further includes a controller that controls the first pneumatic valve, the second pneumatic valve, and the third pneumatic valve.

In some embodiments, the controller comprises a mechanical controller.

In some embodiments, the controller comprises an electronic controller.

In some embodiments, the system further includes an air compressor that provides air to the first pneumatic valve, the second pneumatic valve, and the third pneumatic valve.

In some embodiments, low-pressure air injected into the sample line is at a pressure of 1 to 2 psi.

In some embodiments, the sample analysis device comprises a sampler.

In some embodiments, the sampler provides a sample of the portion of the fluid to be sampled to an analyzer.

In some embodiments, the analyzer comprises a total organic carbon ("TOC") analyzer.

In some embodiments, the sample analysis device comprises an analyzer.

In some embodiments, the sampler and/or the analyzer are part of a clean-in-place (CIP) skid.

In some embodiments, the fluid to be sampled is cleaning effluent.

In some embodiments, the cleaning effluent is from cleaning a pharmaceutical process.

In some embodiments, once the sample is obtained by the sample analysis device and analyzed or otherwise processed, the third pneumatic valve is opened or remains open, and the sample line is purged by air supplied by the third pneumatic valve.

In some embodiments, the sample analysis device and/or the sample line are validated prior to the transfer of the sample of the fluid to be sampled to the sample analysis device.

In some embodiments, validation comprises verification of operation of the sample analysis device.

In some embodiments, the sample analysis device comprises a sampler, an analyzer, or a sampler and an analyzer.

In some embodiments, validation comprises determining a cleanliness of the sample analysis device and/or the sample line.

In some embodiments, the first pneumatic valve and the second pneumatic valve are open, and the third pneumatic valve is closed during validation.

In some embodiments, a fluid is injected into the sample line to perform the validation.

In some embodiments, the fluid has known constituent parameters such that the cleanliness of the sample analysis device and/or the sample line can be determined during validation.

In some embodiments, operational performance of the sample analysis device is determined during validation.

Another implementation of the present disclosure is a method for non-pressurized sample transfer. The method includes providing a non-pressurized liquid line, wherein the non-pressurized liquid line is configured to contain a fluid to be sampled; a first air-operated diaphragm valve and a second air-operated diaphragm in the liquid line, wherein closing either the first air-operated diaphragm valve and/or the second air-operated diaphragm valve prevents flow of the fluid to be sampled through the non-pressurized liquid line; a third air-operated diaphragm valve situated on a stub-out of the non-pressurized liquid line, wherein the stub-out is located between the first air-operated diaphragm valve and the second air-operated diaphragm valve; a sample line having a first end and a second end, wherein the first end if connected to the third air-operated diaphragm valve and the second end is connected to a sample analysis device, wherein the sample line is configured to contain and transfer a sample of the fluid to be sampled to the sample analysis device; a first pneumatic valve that controls air flow to the first air-operated diaphragm valve and the second air-operated diaphragm valve; a second pneumatic valve that controls air flow to the third air-operated diaphragm valve; and a third pneumatic valve that controls low-pressure air injected into the sample line.

The method also includes closing the first air-operated diaphragm valve and the second air-operated diaphragm valve by the first pneumatic valve supplying or removing pressurized air to the first air-operated diaphragm valve and the second air-operated diaphragm valve, said first air-operated diaphragm valve and said second air-operated diaphragm valve closed when the fluid to be sampled is contained in the non-pressurized liquid line so that a portion of the fluid to be sampled is trapped between the first air-operated diaphragm valve and the second air-operated diaphragm valve; opening the third air-operated diaphragm valve or keeping the third air-operated diaphragm valve open by the second pneumatic valve supplying or removing pressurized air to the third air-operated diaphragm valve and at least a portion of the trapped portion of the fluid to be sampled enters the sample line; closing the third air-operated diaphragm valve by the second pneumatic valve supplying or removing pressurized air to the third air-operated diaphragm valve; and opening the third pneumatic valve and the low-pressure air is injected into the sample line, wherein the low-pressure air injected into the sample line moves the portion of the fluid to be sampled in the sample line to the sample analysis device.

In some embodiments, the method further includes closing the third air-operated diaphragm valve by the second pneumatic valve supplying or removing pressurized air to the third air-operated diaphragm valve before the third pneumatic valve is opened and the low-pressure air is injected into the sample line.

In some embodiments, the non-pressurized liquid line is a drain line.

In some embodiments, the non-pressurized liquid line connects one component of a process to another component of a process.

In some embodiments, the non-pressurized liquid line is part of a clean-in-place (CIP) skid.

In some embodiments, the first pneumatic valve, the second pneumatic valve, and the third pneumatic valve are controlled by a controller.

In some embodiments, the controller comprises a mechanical controller.

In some embodiments, the controller comprises an electronic controller.

In some embodiments, an air compressor provides air to the first pneumatic valve, the second pneumatic valve, and the third pneumatic valve.

In some embodiments, low-pressure air injected into the sample line is at a pressure of 1 to 2 psi.

In some embodiments, the sample analysis device comprises a sampler.

In some embodiments, the sampler provides a sample of the portion of the fluid to be sampled to an analyzer.

In some embodiments, the analyzer comprises a total organic carbon ("TOC") analyzer.

In some embodiments, the sample analysis device comprises an analyzer.

In some embodiments, the analyzer comprises a total organic carbon ("TOC") analyzer.

In some embodiments, the sampler and/or the analyzer are part of a clean-in-place (CIP) skid.

In some embodiments, the fluid to be sampled is cleaning effluent.

In some embodiments, the cleaning effluent is from cleaning a pharmaceutical process.

In some embodiments, the method further includes purging the sample line once the sample is obtained by the sample analysis device and analyzed or otherwise processed by opening the third pneumatic valve or having it remain open and the sample line is purged by air supplied by the third pneumatic valve.

In some embodiments, the sample analysis device and/or the sample line are validated prior to the transfer of the sample of the fluid to be sampled to the sample analysis device.

In some embodiments, validation comprises verification of operation of the sample analysis device.

In some embodiments, the sample analysis device comprises a sampler, an analyzer, or a sampler and an analyzer.

In some embodiments, validation comprises determining a cleanliness of the sample analysis device and/or the sample line.

In some embodiments, the first pneumatic valve and the second pneumatic valve are open, and the third pneumatic valve is closed during validation.

In some embodiments, a fluid is injected into the sample line to perform the validation.

In some embodiments, the fluid has known constituent parameters such that the cleanliness of the sample analysis device and/or the sample line can be determined during validation.

In some embodiments, operational performance of the sample analysis device is determined during validation.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF DRAWINGS

Example features and implementations are disclosed in the accompanying drawings. However, the present disclosure is not limited to the precise arrangements and instrumentalities shown.

DETAILED DESCRIPTION

Figure 1:
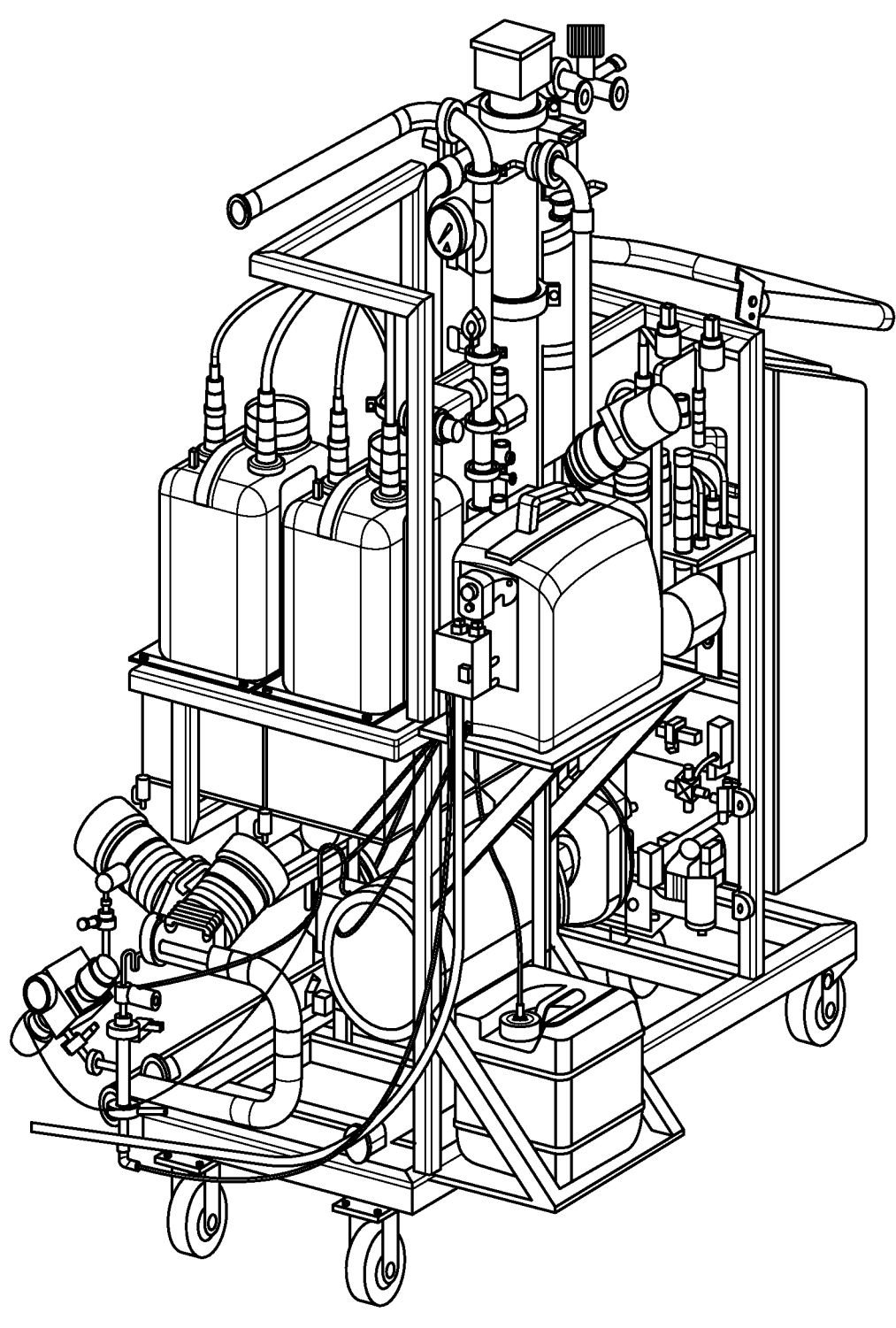
FIG. 1 illustrates an exemplary clean-in-place (CIP) skid that may be used with some embodiments described herein.

Before the present methods and systems are disclosed and described, it is to be understood that the methods and systems are not limited to specific synthetic methods, specific components, or to particular compositions. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Overview

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

Disclosed and described herein are embodiments of systems, devices and methods for automated delivery of an unpressurized liquid sample to a testing instrument without mechanical pumps. In some instances, it further uses an active purge mechanism using the same components and functionality to clean the sampling line, which is paramount in pharmaceutical and beverage processes.

Sample Transfer System

Figures 2A, 2B:
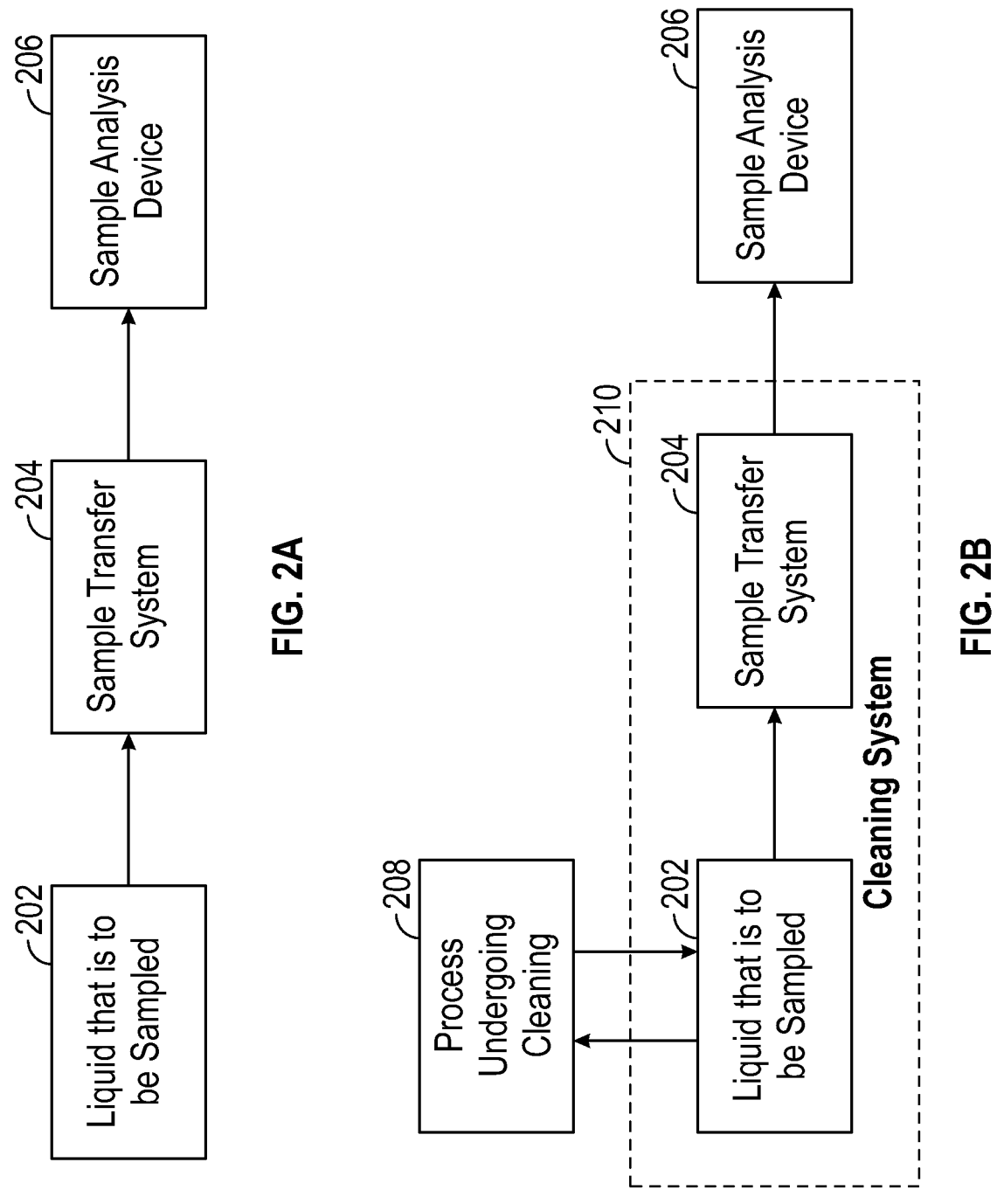
FIGS. 2A-2D are exemplary simplified block diagrams illustrating implementations of a sample transfer system as disclosed and described herein.

FIGS. 2A-2D are simplified block diagrams that illustrate various implementations of embodiments of a sample transfer system, as disclosed and described herein. In FIG. 2A, a sample of a liquid to be sampled 202 is obtained by a sample transfer system 204, as embodiments are described herein, and provided to a sample analysis device 206. FIG. 2B expands on the disclosure of FIG. 2A. In FIG. 2B, the sample of the liquid to be sampled 202 is obtained from the cleaning effluent of a process undergoing cleaning 208. For example, the process undergoing cleaning 208 may be a pharmaceutical manufacturing process, a food manufacturing process, or any other process that require testing for contamination and/or residue during a cleaning process. In particular, pharmaceutical process equipment cleaning requires sampling and testing of liquid solutions for residual drug components and cleaning agents. In FIG. 2B, the effluent from which the sample of the liquid to be sampled 202 may be cleaning effluent in a cleaning system 210. Such a cleaning system 210 may be, for example, a clean-in-place (CIP) skid, such as the one shown in FIG. 1. Further, the sample transfer system 204, in some instances, may be incorporated into the cleaning system 210. As with FIG. 2A, in FIG. 2B, the sample of a liquid to be sampled 202 is obtained by a sample transfer system 204, as embodiments are described herein, and provided to the sample analysis device 206.

Figure 2C:
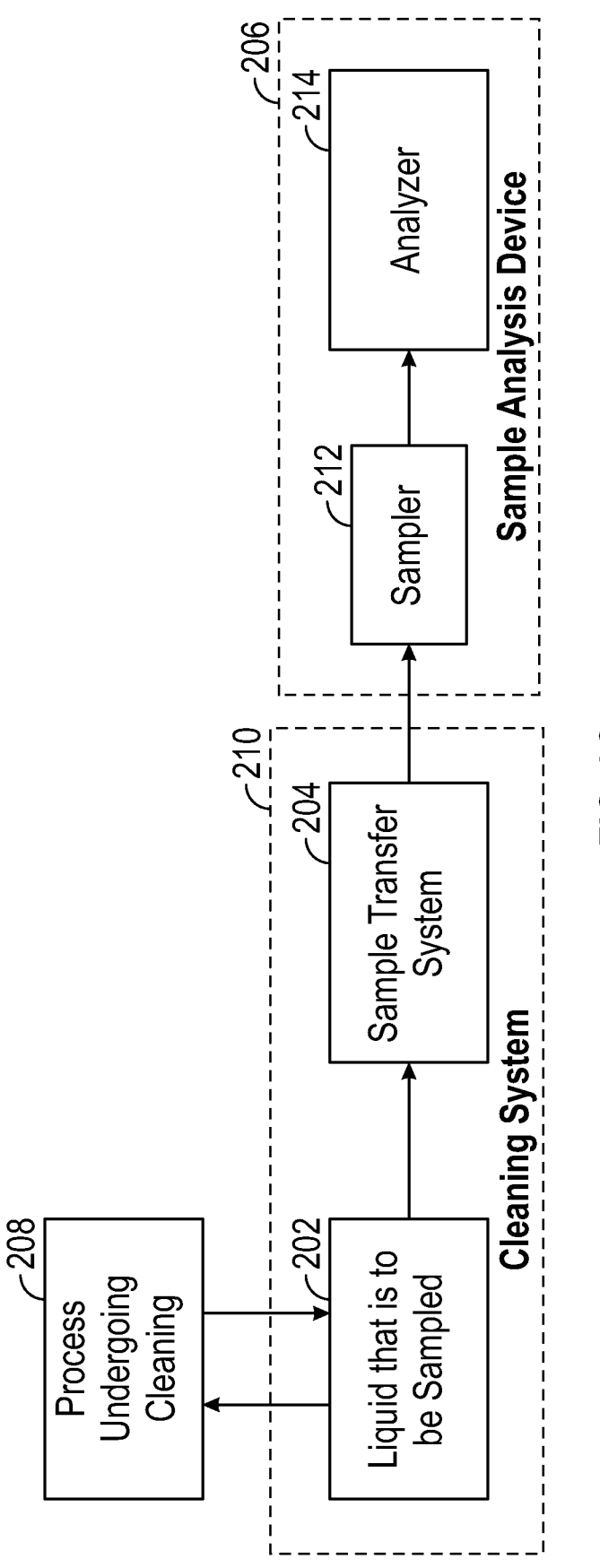
Figure 2D:
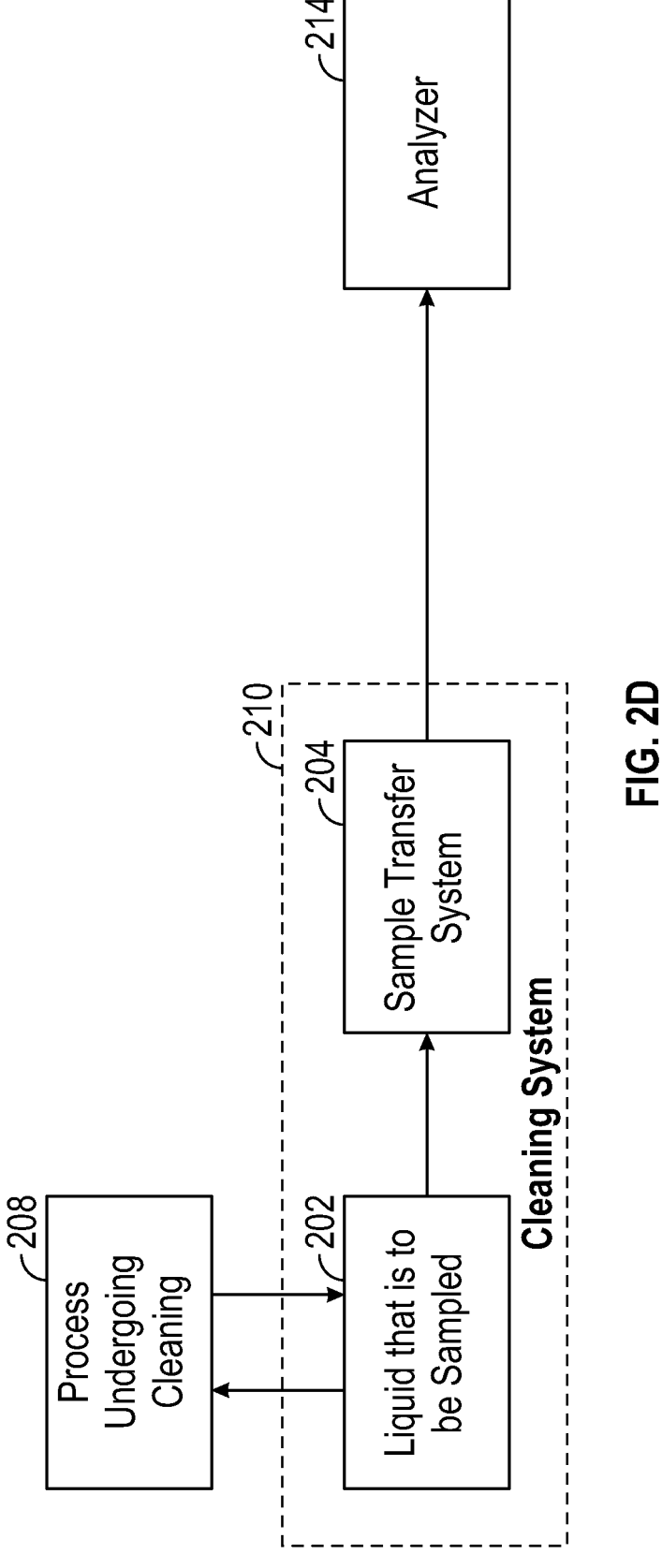

In FIG. 2C, the sample transfer system 204 provides the sample of the liquid to be sampled 202 to a sampler 212. A non-limiting example of such a sampler 212 is the one mentioned in U.S. Pat. No. 9,074,967, previously incorporated by reference, though other samplers may be used. The sampler 212 then supplies the sample to an analyzer 214. In other words, the sampler 212 and the analyzer 214, together, comprise the sample analysis device 206. The analyzer 214 can be any type of analyzer including, for example, a TOC analyzer, as previously mentioned. In FIG. 2D, the sample transfer system 204 provides the sample of the liquid to be sampled 202 directly to an analyzer 214. In this implementation, the analyzer 214 comprises the sample analysis device 206.

Figure 3:
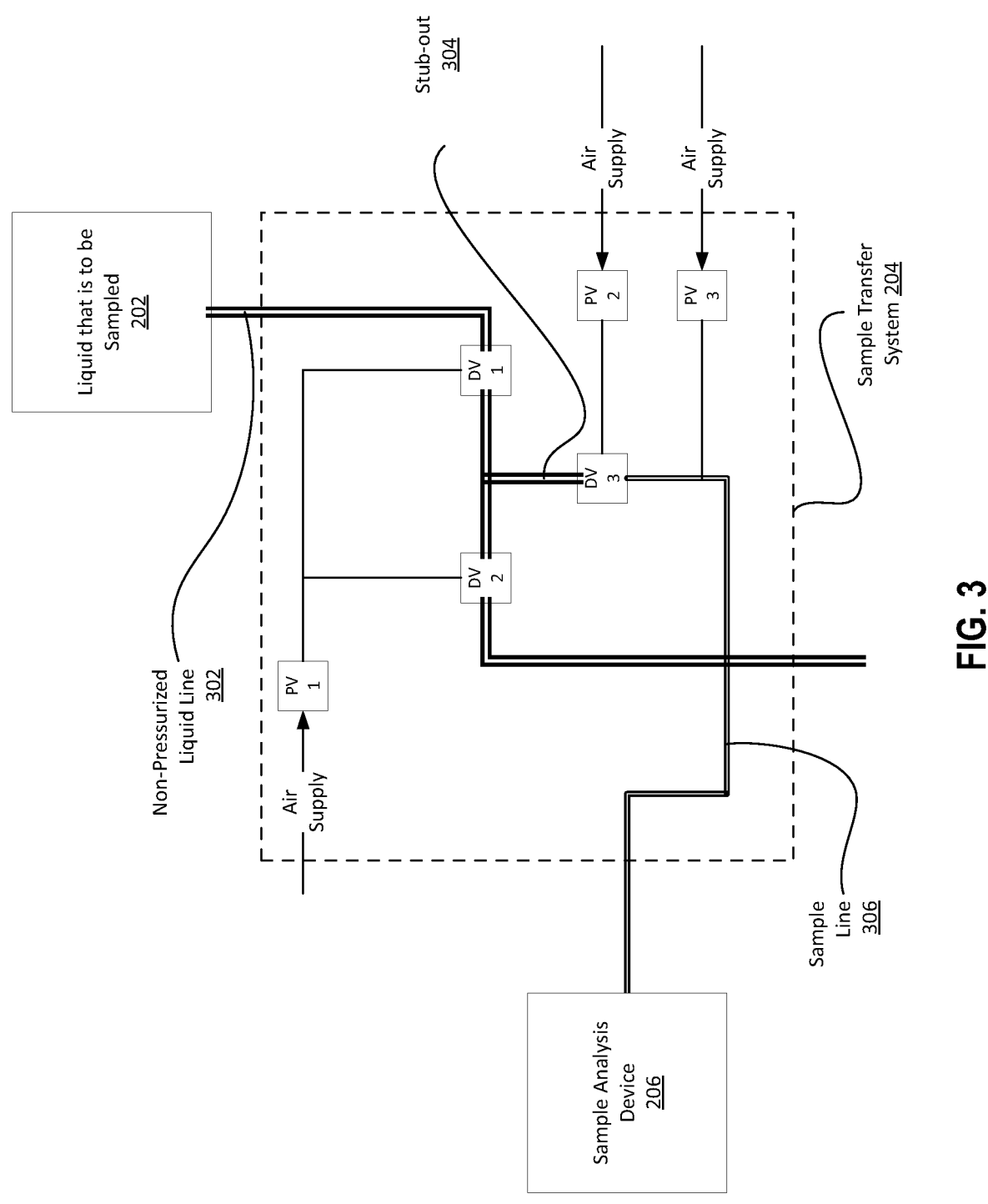
FIG. 3 illustrates one implementation of a sample transfer system.

FIG. 3 is a more-detailed illustration of one embodiment of a sample transfer system 204 for non-pressurized sample transfer. Comprising part of the system 204 is a non-pressurized liquid line 302. The non-pressurized liquid line 302 is configured to contain a fluid to be sampled. For example, the fluid obtained from a cleaning cycle of a process such as a pharmaceutical manufacturing process. In some instances, the fluid may be an effluent from the cleaning process. The non-pressurized liquid line 302 may comprise, for example, a drain line, a liquid line that connects one component of a process to another component of a process, and the like. The non-pressurized fluid line 302 may be comprised of any suitable material such as metals, plastics, rubber, and the like, or combinations thereof. In some instances, the non-pressurized liquid line 302 is part of a clean-in-place (CIP) skid. Further comprising the system 204 of FIG. 3 is a first air-operated diaphragm valve (DV 1) and a second air-operated diaphragm valve (DV 2) in the liquid line 302. As can be seen in FIG. 3, when either the first air-operated diaphragm valve DV 1 and/or the second air-operated diaphragm valve DV 2 are closed, this prevents flow of the fluid to be sampled through the non-pressurized liquid line 302. A third air-operated diaphragm valve DV 3 is situated on a stub-out 304 of the non-pressurized liquid line 302. The stub-out 304 is located between the first air-operated diaphragm valve DV 1 and the second air-operated diaphragm valve DV 2. A sample line 306 having a first end and a second end is connected to the third air-operated diaphragm valve DV 3. The first end of the sample line 306 is connected to the third air-operated diaphragm valve DV 3 and the second end of the sample line 306 is connected to a sample analysis device 206. The sample line 306 is configured to contain and transfer a sample of the fluid to be sampled to the sample analysis device 206. The sample may comprise approximately 60 mL of the fluid to be sampled, though the sample may also be greater than or less than 60 mL. The sample line 306 may be comprised of any suitable material such as metals, plastics, rubber, and the like, or combinations thereof. The diaphragm valves are air-operated. This means that each valve may be opened or closed by either providing pressurized air to the diaphragm valve, or by removing pressurized air from the diaphragm air.

Further comprising the implementation shown in FIG. 3 is a first pneumatic valve (PV 1) that controls air flow to the first air-operated diaphragm valve DV 1 and the second air-operated diaphragm valve DV2, a second pneumatic valve (PV 2) that controls air flow to the third air-operated diaphragm valve DV 3, and a third pneumatic valve (PV 3) that controls air injected into the sample line 306. The pneumatic valves (PV 1, PV 2, and PV 3) are controlled by a controller (not shown). The controller may be a mechanical controller and/or an electronic controller. The pneumatic valves respond to signals from the controller by opening or closing. The first air-operated diaphragm valve DV 1, the second air-operated diaphragm valve DV 2, and the third air-operated diaphragm valve DV 3 are operated by the first pneumatic valve PV 1 and the second pneumatic valve PV 2 supplying or removing pressurized air to the first air-operated diaphragm valve DV 1, the second air-operated diaphragm valve DV 2, and the third air-operated diaphragm valve DV 3. Pressurized air is generally supplied by one or more air compressors (not shown in FIG. 3). The pressure that this air is supplied at may be regulated, as desired. As can be seen in FIG. 3, the first air-operated diaphragm valve DV 1 and the second air-operated diaphragm valve DV 2 are closed when the fluid to be sampled is contained in the non-pressurized liquid line 302 and the stub-out 304 so that a portion of the fluid to be sampled is trapped between the first air-operated diaphragm valve DV 1 and the second air-operated diaphragm valve DV 2, and at least a portion of this trapped fluid to be sampled enters the sample line 306 through open air-operated diaphragm valve DV 3. Once the desired amount of the portion of the fluid to be sampled enters the sample line 306, the third air-operated diaphragm valve DV 3 is closed by the second pneumatic valve PV 2 supplying or removing pressurized air to the third air-operated diaphragm valve DV 3. Then, the third pneumatic valve PV 3 is opened and low-pressure air is injected into the sample line 306. When the low-pressure air is injected into the sample line 306, it causes the portion of the fluid to be sampled in the sample line 306 to move to the sample analysis device 206. The low-pressure air injected into the sample line 306 may be from 1 to 2 psi.

In some instances, the system shown in FIG. 3 can be attached to or be a part of a clean-in-place (CIP) skid. In some instances, once the sample is obtained by the sample analysis device 206 and analyzed or otherwise processed, the third pneumatic valve PV 3 may be opened or remain open and be used to purge the sample line 306.

FIGS. 4A-4J illustrate the steps of an exemplary application of an embodiment of the sample transfer system 204 described herein from verification to blowdown. The shown embodiments include a sampler 212 and an analyzer 214. Also shown in these illustrations are the state of the sampler 212 in each step. As shown in these figures, not all steps are always required or may be performed in an order not shown in the figures. These figures should be referenced concurrently with FIGS. 2B and 3 for element identifiers.

Figure 4A:
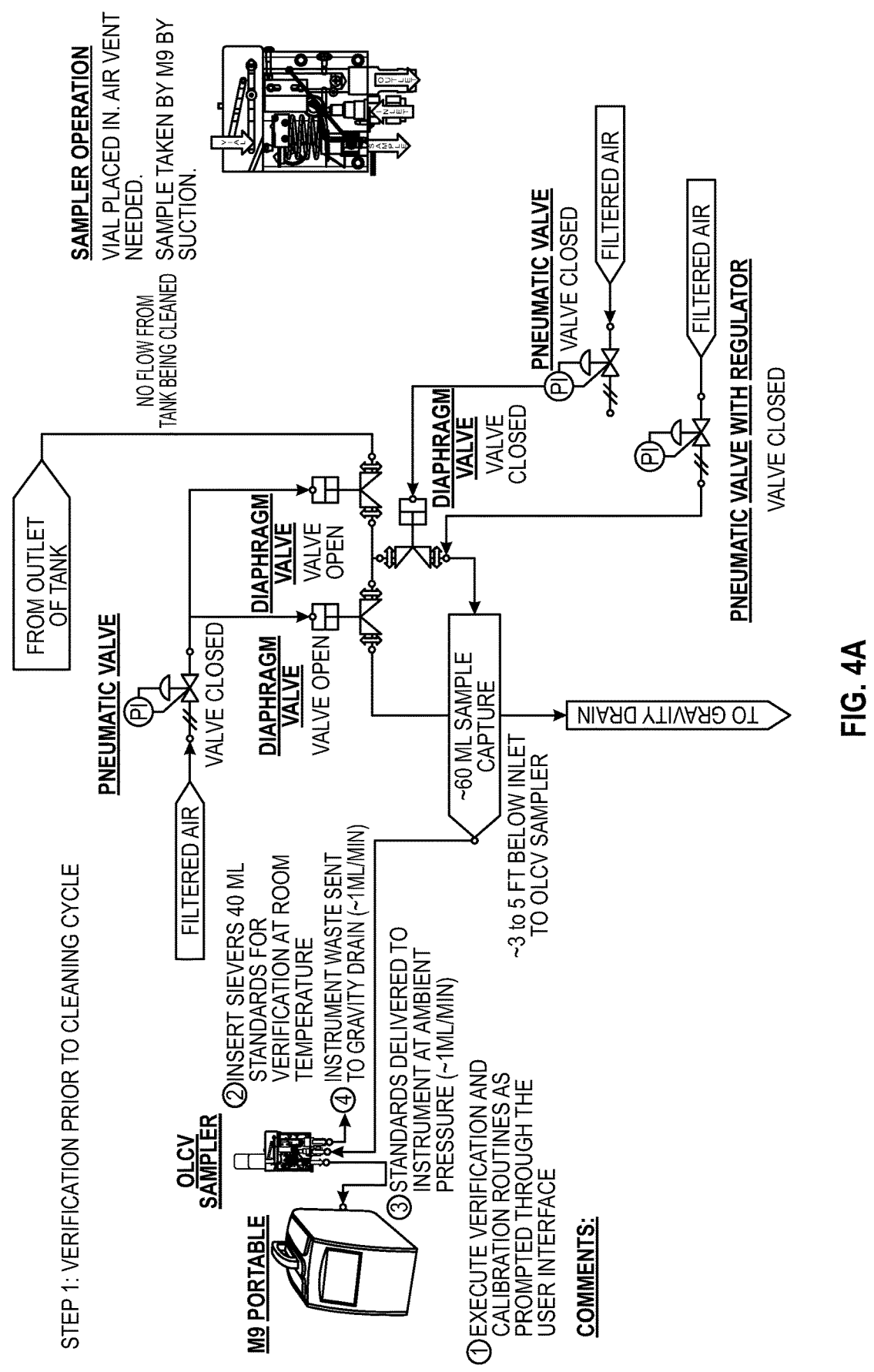
FIGS. 4A-4J illustrate the steps of an exemplary application of an embodiment of the sample transfer system described herein from verification to blowdown.

FIG. 4A illustrates a verification step for the analyzer 214 prior to a cleaning cycle for the process being cleaned where DV 1 and DV 2 are open, DV 3 is closed, and (typically, but not always) there is no liquid in the non-pressurized liquid line 302. This is a validation step to check the operation, condition, and cleanliness of the analyzer 214, sampler 212, and the non-pressurized liquid line 302. For example, a fluid (e.g., air, water, etc.) of known content/cleanliness can be injected into and run through the non-pressurized liquid line 302, sampler 212 and analyzer 214 to "check" and see the state of the system prior to running a cleaning cycle or if the analyzer 214 is exhibiting erratic or poor behavior it can be identified and rectified on a component level. Once the fluid (negative control) is established, the system can then be blown down with air to remove any residual water and be ready for the next cleaning cycle. For example, during validation a fluid having known constituent parameters (known levels of TOC, metals, contaminants, chemicals, particles, etc.) can be injected into the sample line and then analyzed with a calibrated analyzer(s) to determine if there has been any change as the fluid has passed through the sample line and/or the sample analysis device. Likewise, a fluid with known constituents can be injected into the sample line during validation and then the analyzer(s) is used to analyze the injected fluid. This is compared to the known constituents of the fluid, and/or to the findings of another analyzer to verify the analysis of the analyzer.

Figure 4B:
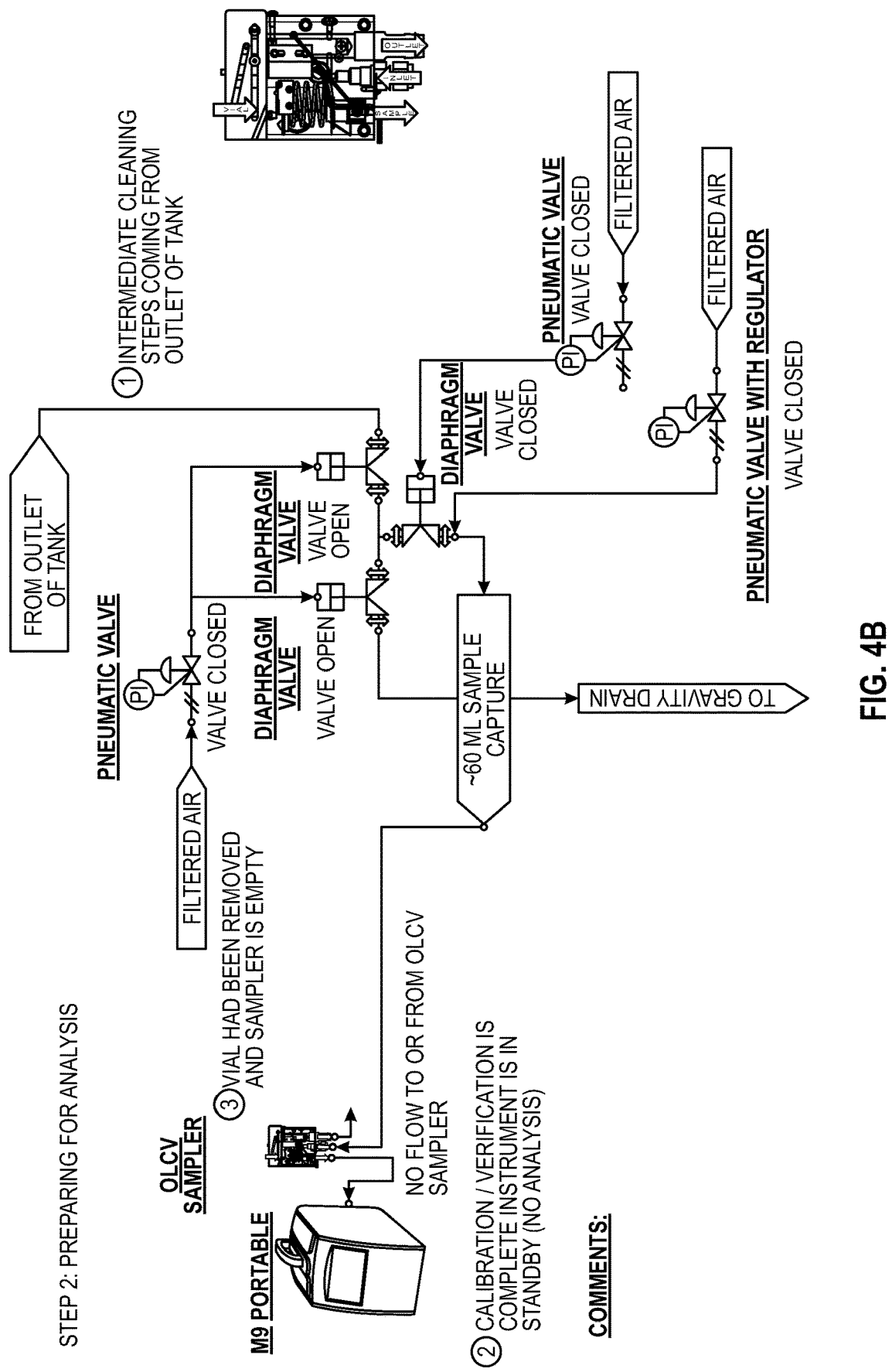
Figure 4C:
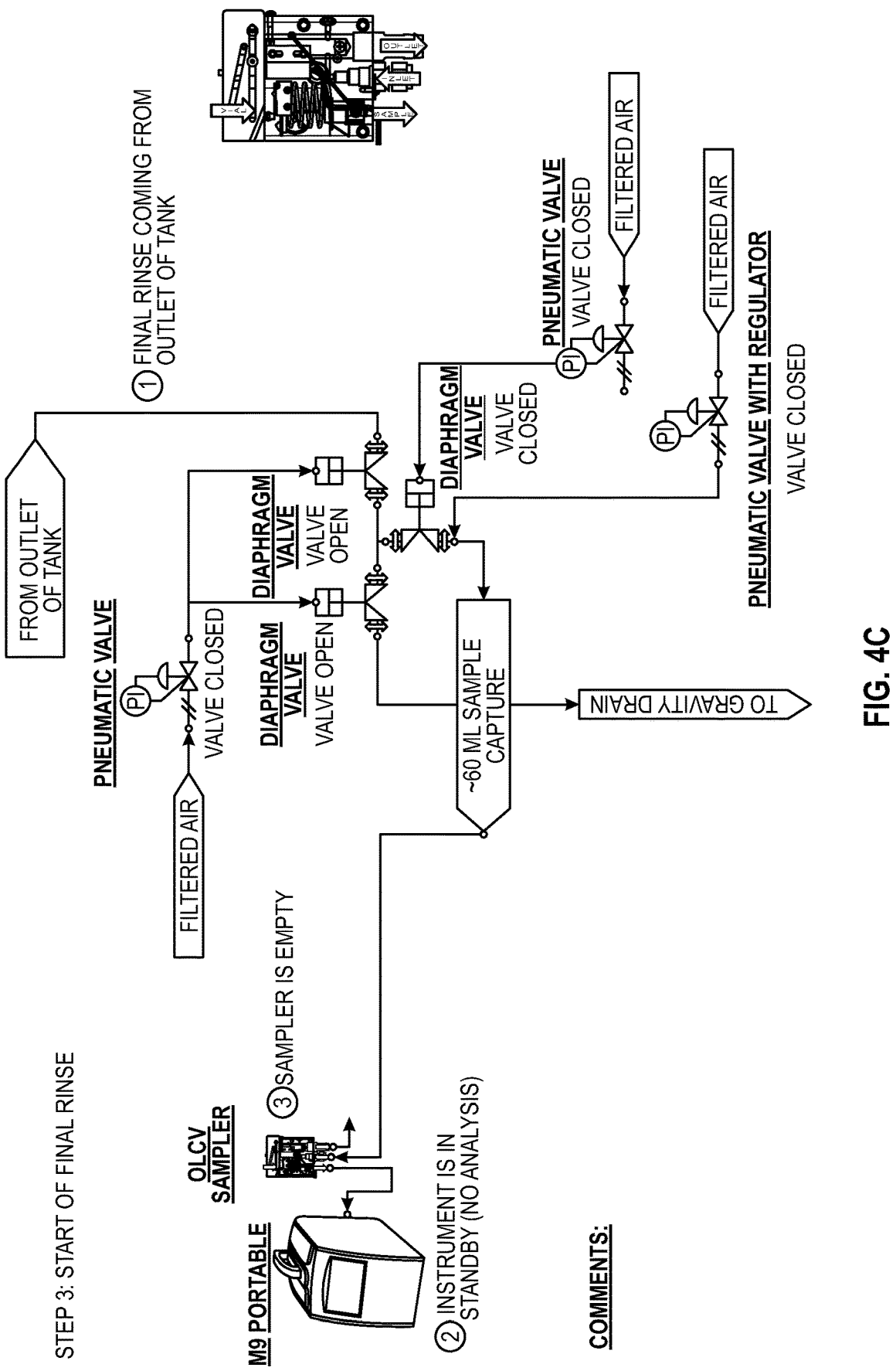
Figure 4D:
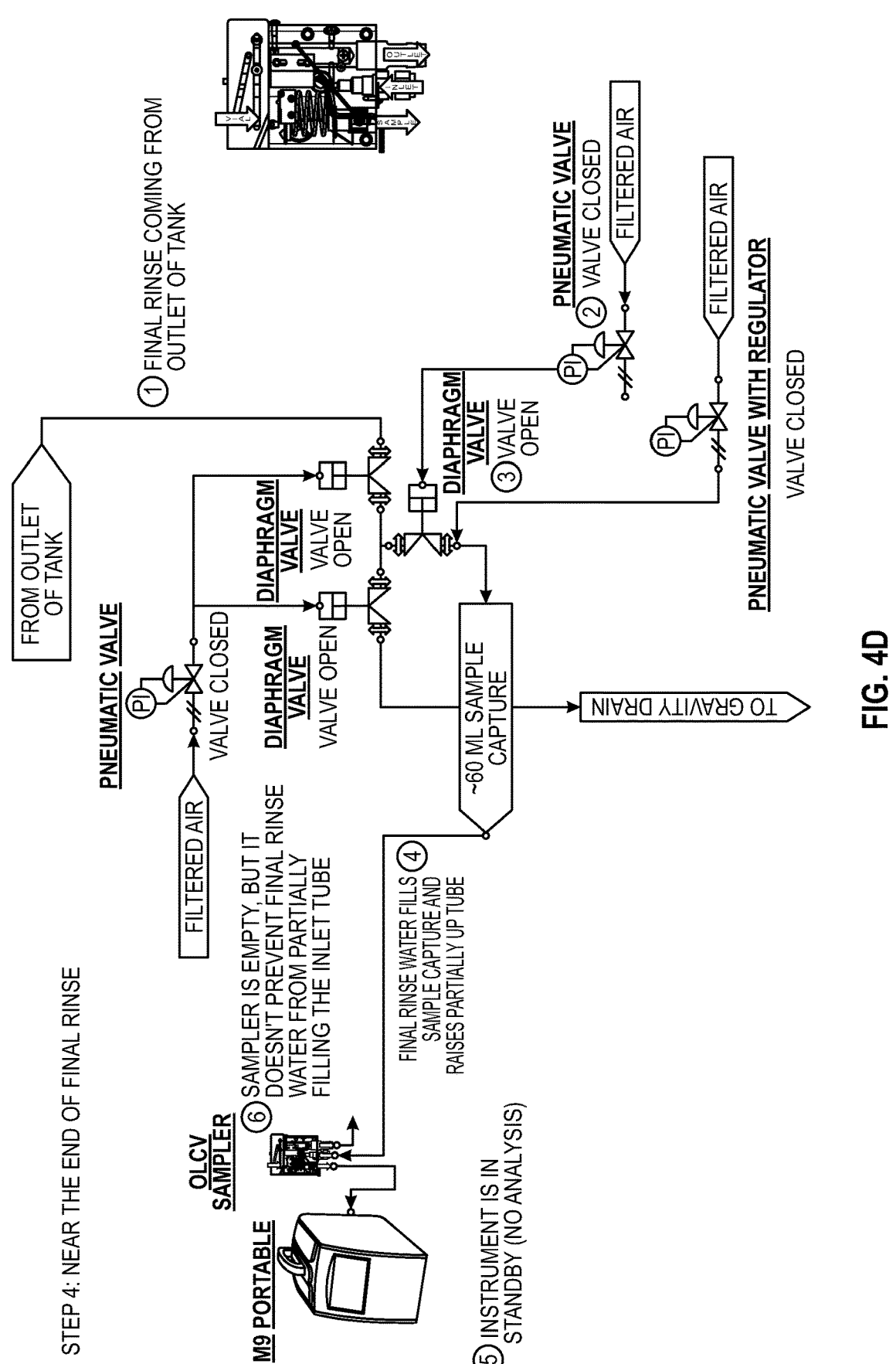
Figure 4E:
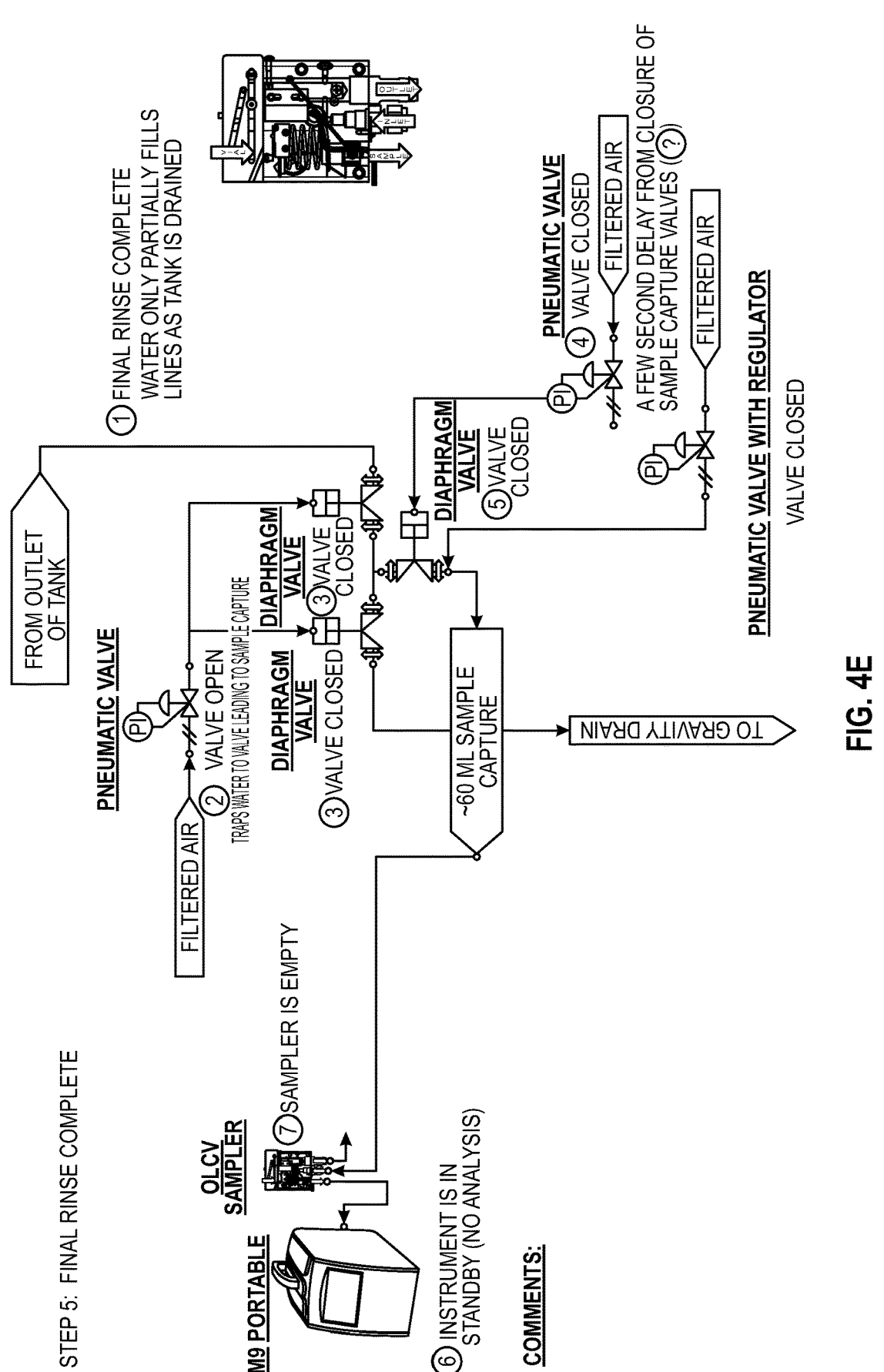
Figure 4F:
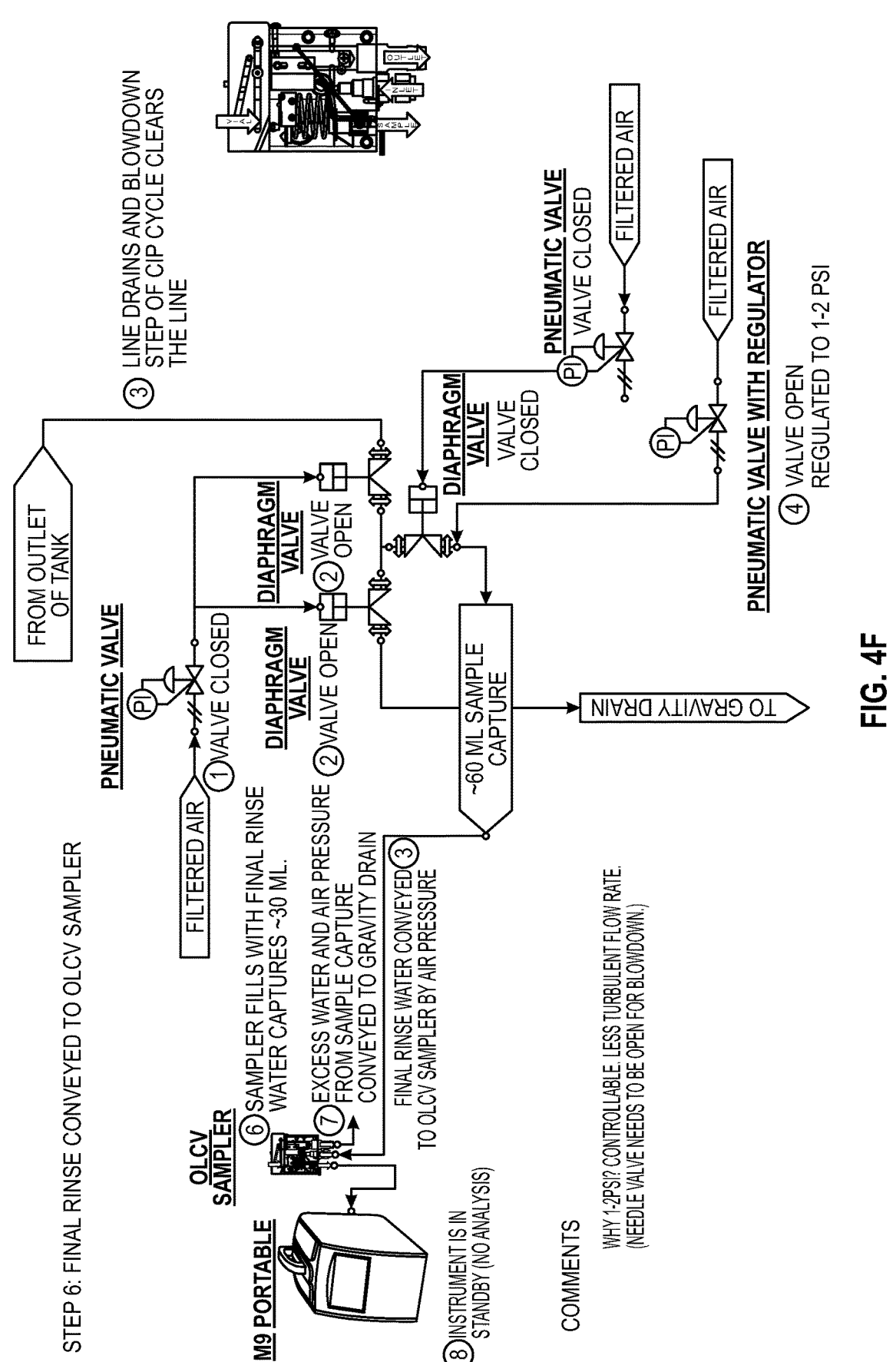
Figure 4G:
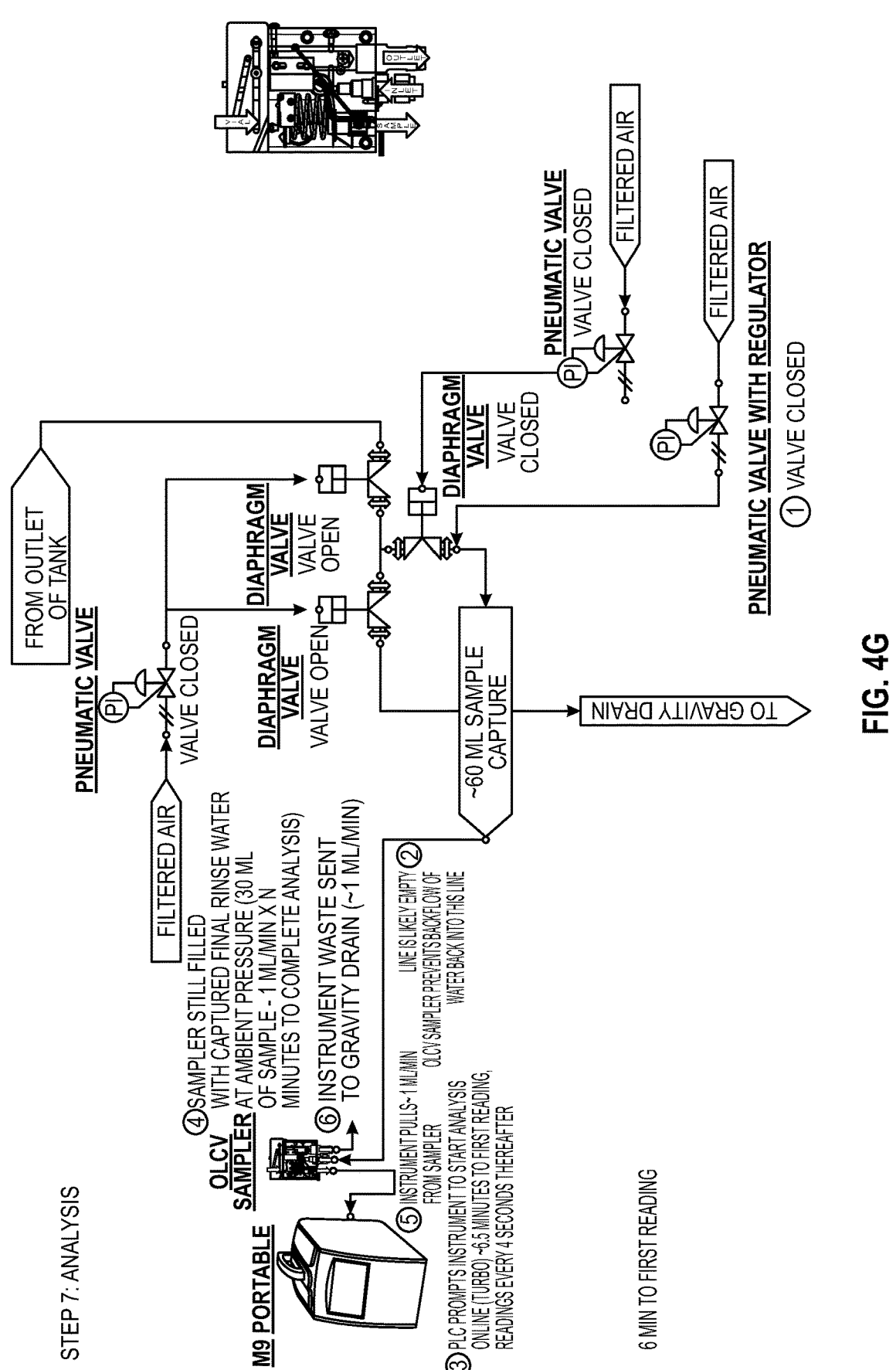
Figure 4H:
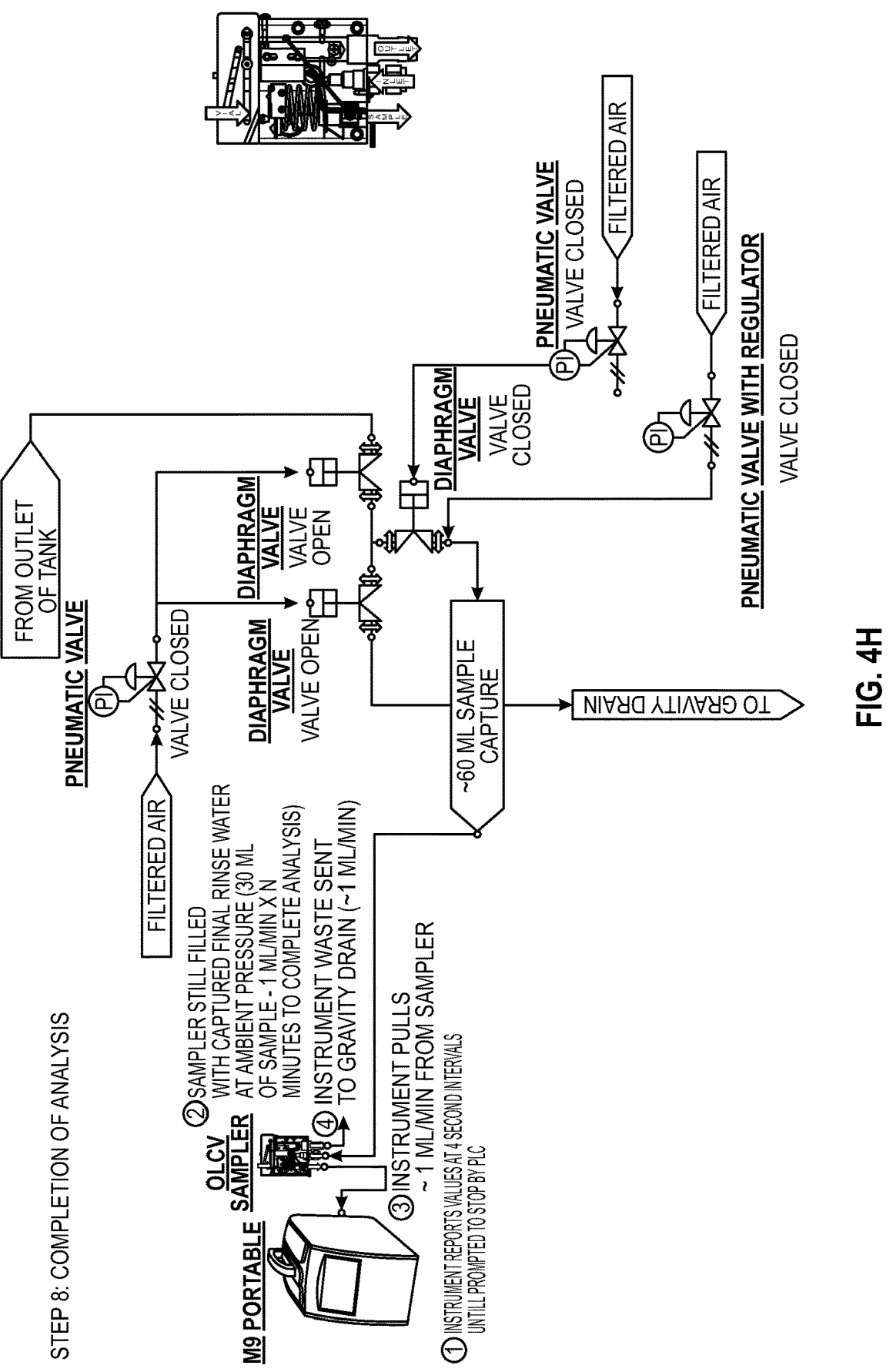
Figure 4I:
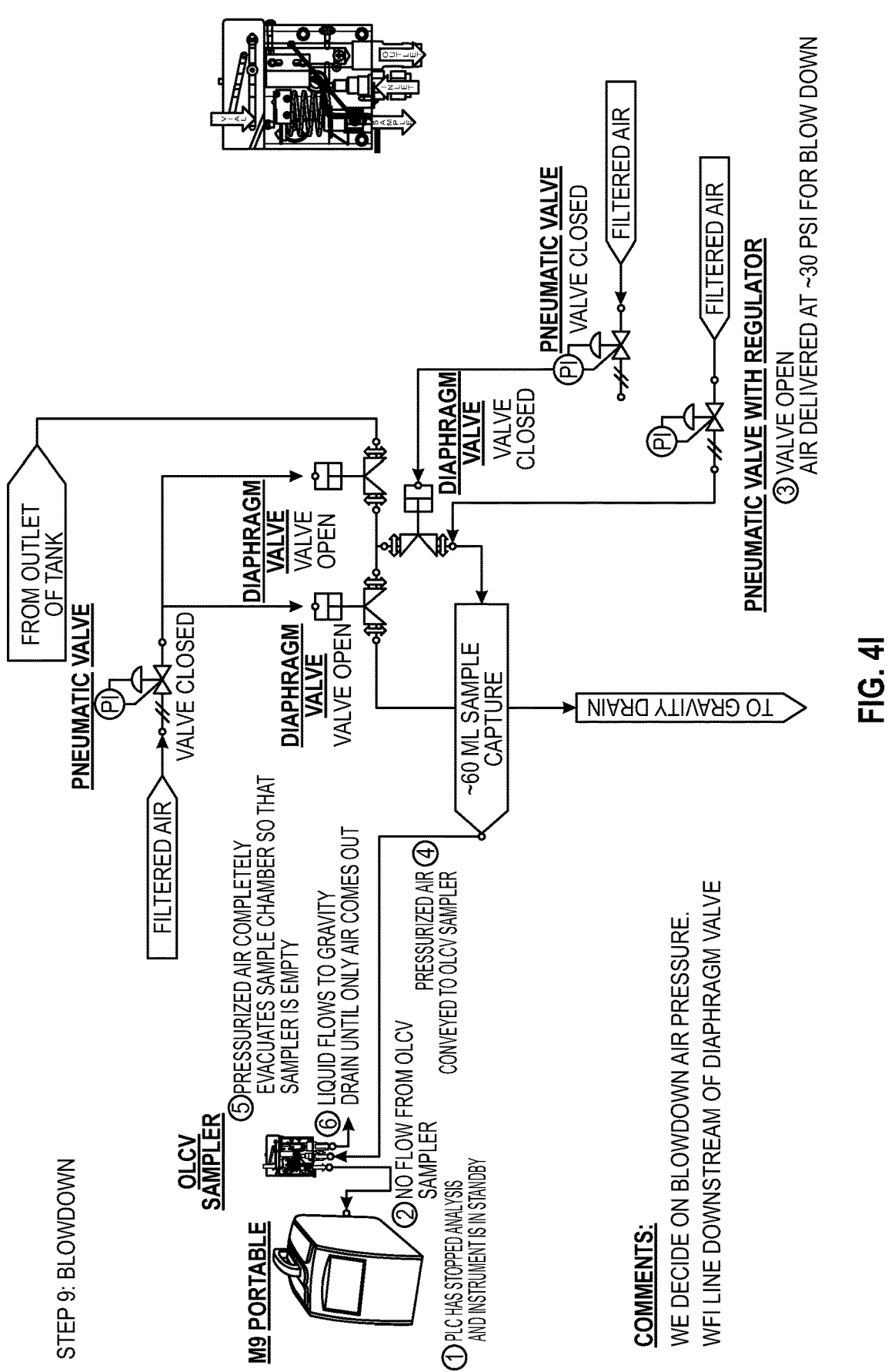
Figure 4J:
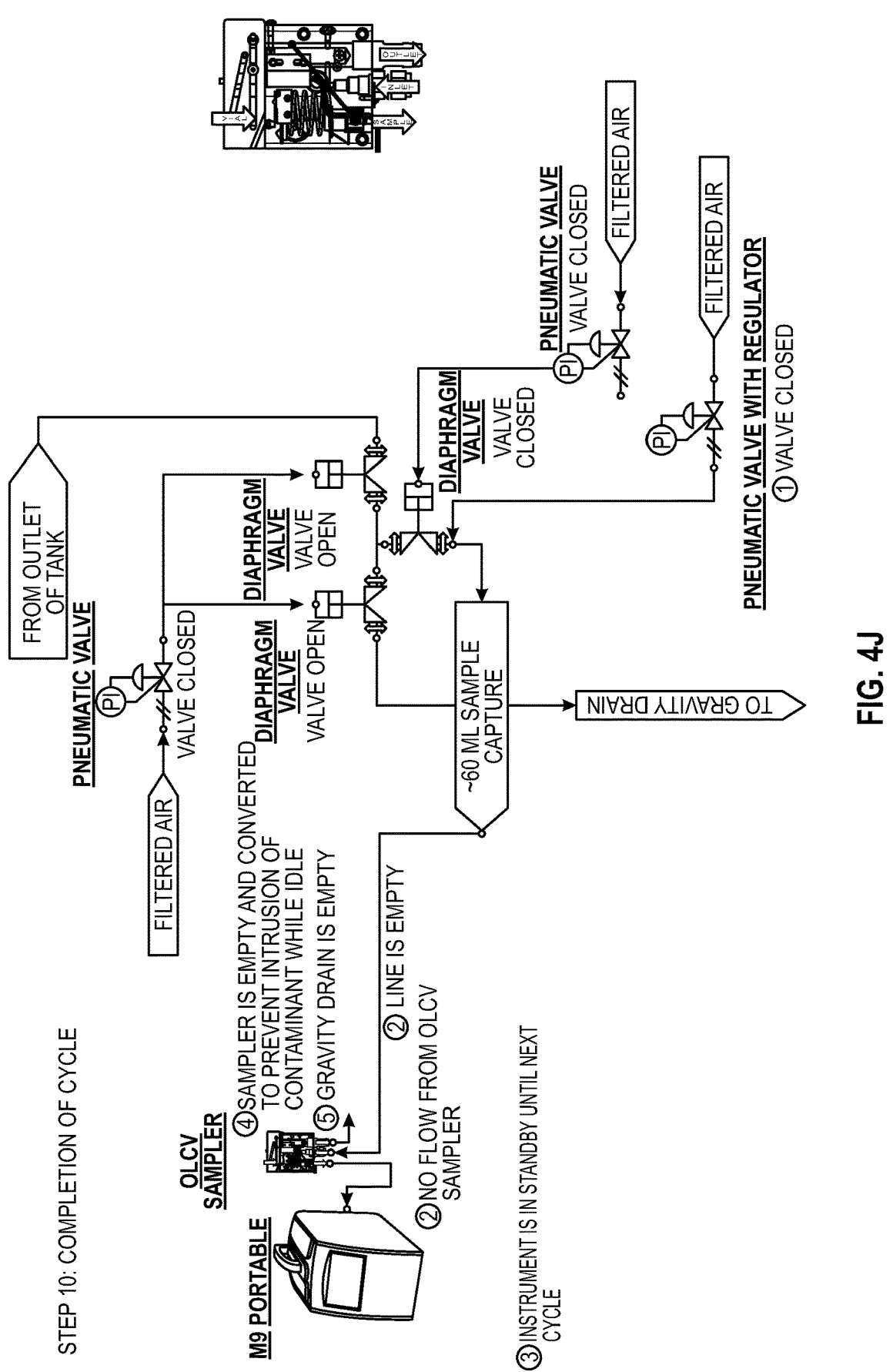

In FIG. 4B, DV 1 and DV 2 are opened, while DV 3 remains closed. Liquid starts flowing from the process being cleaned through the non-pressurized liquid line 302. In FIG. 4C, liquid from a final rinse of the process being cleaned begins to flow through the non-pressurized liquid line 302. In FIG. 4D, which is near the end of the final rinse of the process being cleaned, diaphragm valve DV 3 is opened and some of the rinse water flows into the sample line 306. In FIG. 4E, valves DV 1 and DV 2 are closed, thus stopping the flow of the liquid in the non-pressurized liquid line 302, and DV 3 is closed, thus capturing the sample in the sample line 306. In FIG. 4F, pneumatic valve PV 3 is opened thus supplying low-pressure air into the sample line 306. The low-pressure air has been regulated to 1 to 2 psi. The low-pressure air conveys the sample to the sampler 212 via the sample line 306. In FIGS. 4G and 4H, the sample is obtained by the sampler 212 and pneumatic valve PV 3 is closed. The sampler 212 provides the sample to the analyzer 214, where analysis is performed. At FIG. 4I, pneumatic valve PV 3 opens and air that has been regulated to approximately 30 psi is used to clear out and blow down the sample line 306. At FIG. 4J, the sample has been obtained, analyzed, and the sample line cleared, so that the system returns to a state similar to that shown in FIG. 4A.

Configuration of Exemplary Embodiments

A number of example implementations are provided herein. However, it is understood that various modifications can be made without departing from the spirit and scope of the disclosure herein. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. Although the terms "comprising" and "including" have been used herein to describe various implementations, the terms "consisting essentially of" and "consisting of" can be used in place of "comprising" and "including" to provide for more specific implementations and are also disclosed.

Disclosed are materials, systems, devices, methods, compositions, and components that can be used for, can be used in conjunction with, can be used in preparation for, or are products of the disclosed methods, systems, and devices. These and other components are disclosed herein, and it is understood that when combinations, subsets, interactions, groups, etc. of these components are disclosed that while specific reference of each various individual and collective combinations and permutations of these components may not be explicitly disclosed, each is specifically contemplated and described herein. For example, if a device is disclosed and discussed each and every combination and permutation of the device, and the modifications that are possible are specifically contemplated unless specifically indicated to the contrary. Likewise, any subset or combination of these is also specifically contemplated and disclosed. This concept applies to all aspects of this disclosure including, but not limited to, steps in methods using the disclosed systems or devices. Thus, if there are a variety of additional steps that can be performed, it is understood that each of these additional steps can be performed with any specific method steps or combination of method steps of the disclosed methods, and that each such combination or subset of combinations is specifically contemplated and should be considered disclosed.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications may be referenced. The disclosures of these publications in their entireties are hereby incorporated by reference into this application in order to more fully describe the state of the art to which the methods and systems pertain.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A system for sample transfer, the system comprising:
a non-pressurized liquid line, wherein the non-pressurized liquid line is configured to contain a fluid to be sampled;
a first air-operated diaphragm valve and a second air-operated diaphragm valve in the liquid line, wherein closing either the first air-operated diaphragm valve and/or the second air-operated diaphragm valve prevents flow of the fluid to be sampled through the non-pressurized liquid line;
a third air-operated diaphragm valve situated on a stub-out of the non-pressurized liquid line, wherein the stub-out is located between the first air-operated diaphragm valve and the second air-operated diaphragm valve;

a sample line having a first end and a second end, wherein the first end if connected to the third air-operated diaphragm valve and the second end is connected to a sample analysis device, wherein the sample line is configured to contain and transfer a sample of the fluid to be sampled to the sample analysis device;

a first pneumatic valve that controls air flow to the first air-operated diaphragm valve and the second air-operated diaphragm valve;

a second pneumatic valve that controls air flow to the third air-operated diaphragm valve; and a third pneumatic valve that controls low-pressure air injected into the sample line, wherein:

the first air-operated diaphragm valve and the second air-operated diaphragm valve are closed by the first pneumatic valve supplying or removing pressurized air to the first air-operated diaphragm valve and the second air-operated diaphragm valve, said first air-operated diaphragm valve and second air-operated diaphragm valve closed when the fluid to be sampled is contained in the non-pressurized liquid line so that a portion of the fluid to be sampled is trapped between the first air-operated diaphragm valve and the second air-operated diaphragm valve, the third air-operated diaphragm valve remains open or is opened by the second pneumatic valve supplying or removing pressurized air to the third air-operated diaphragm valve and at least a portion of the trapped portion of the fluid to be sampled enters the sample line, the third air-operated diaphragm valve is closed by the second pneumatic valve supplying or removing pressurized air to the third air-operated diaphragm valve, the third pneumatic valve is opened and the low-pressure air is injected into the sample line, the low-pressure air injected into the sample line moves the portion of the fluid to be sampled in the sample line to the sample analysis device, and wherein the third air-operated diaphragm valve is closed by the second pneumatic valve supplying or removing pressurized air to the third air-operated diaphragm valve before the third pneumatic valve is opened and the low-pressure air is injected into the sample line.

2. The system of claim 1, wherein the non-pressurized liquid line is part of a clean-in-place (CIP) skid.

3. The system of claim 1, further comprising a controller configured to control the first pneumatic valve, the second pneumatic valve, and the third pneumatic valve.

4. The system of claim 1, further comprising an air compressor configured to provide air to the first pneumatic valve, the second pneumatic valve, and the third pneumatic valve.

5. The system of claim 1, wherein the sample analysis device comprises a total organic carbon ("TOC") analyzer.

6. The system of claim 1, wherein the fluid to be sampled is cleaning effluent.

7. The system of claim 1, wherein the third pneumatic valve is opened or remains open and the sample line is purged by air supplied by the third pneumatic valve responsive to the sample being analyzed by the sample analysis device.

8. A system for sample transfer, the system comprising:

a non-pressurized liquid line, wherein the non-pressurized liquid line is configured to contain a fluid to be sampled;

a first air-operated diaphragm valve and a second air-operated diaphragm valve in the liquid line, wherein closing either the first air-operated diaphragm valve and/or the second air-operated diaphragm valve prevents flow of the fluid to be sampled through the non-pressurized liquid line;

a third air-operated diaphragm valve situated on a stub-out of the non-pressurized liquid line, wherein the stub-out is located between the first air-operated diaphragm valve and the second air-operated diaphragm valve;

a sample line having a first end and a second end, wherein the first end if connected to the third air-operated diaphragm valve and the second end is connected to a sample analysis device, wherein the sample line is configured to contain and transfer a sample of the fluid to be sampled to the sample analysis device;

a first pneumatic valve that controls air flow to the first air-operated diaphragm valve and the second air-operated diaphragm valve;

a second pneumatic valve that controls air flow to the third air-operated diaphragm valve; and a third pneumatic valve that controls low-pressure air injected into the sample line, wherein:

the first air-operated diaphragm valve and the second air-operated diaphragm valve are closed by the first pneumatic valve supplying or removing pressurized air to the first air-operated diaphragm valve and the second air-operated diaphragm valve, said first air-operated diaphragm valve and second air-operated diaphragm valve closed when the fluid to be sampled is contained in the non-pressurized liquid line so that a portion of the fluid to be sampled is trapped between the first air-operated diaphragm valve and the second air-operated diaphragm valve, the third air-operated diaphragm valve remains open or is opened by the second pneumatic valve supplying or removing pressurized air to the third air-operated diaphragm valve and at least a portion of the trapped portion of the fluid to be sampled enters the sample line, the third air-operated diaphragm valve is closed by the second pneumatic valve supplying or removing pressurized air to the third air-operated diaphragm valve, the third pneumatic valve is opened and the low-pressure air is injected into the sample line, the low-pressure air injected into the sample line moves the portion of the fluid to be sampled in the sample line to the sample analysis device, wherein at least one of the sample analysis device or the sample line are validated prior to the transfer of the sample of the fluid to the sample analysis device, and wherein, during validation, the first pneumatic valve and the second pneumatic valve are open and the third pneumatic valve is closed.

9. A method for sample transfer, the method comprising: providing:

a non-pressurized liquid line, wherein the non-pressurized liquid line is configured to contain a fluid to be sampled;

a first air-operated diaphragm valve and a second air-operated diaphragm in the liquid line, wherein closing either the first air-operated diaphragm valve and/or the second air-operated diaphragm valve prevents flow of the fluid to be sampled through the non-pressurized liquid line;

a third air-operated diaphragm valve situated on a stub-out of the non-pressurized liquid line, wherein the stub-out is located between the first air-operated diaphragm valve and the second air-operated diaphragm valve;

a sample line having a first end and a second end, wherein the first end if connected to the third air-operated diaphragm valve and the second end is connected to a sample analysis device, wherein the sample line is configured to contain and transfer a sample of the fluid to be sampled to the sample analysis device;

a first pneumatic valve that controls air flow to the first air-operated diaphragm valve and the second air-operated diaphragm valve;

a second pneumatic valve that controls air flow to the third air-operated diaphragm valve; and a third pneumatic valve that controls low-pressure air injected into the sample line; and closing the first air-operated diaphragm valve and the second air-operated diaphragm valve by the first pneumatic valve supplying or removing pressurized air to the first air-operated diaphragm valve and the second air-operated diaphragm valve, said first air-operated diaphragm valve and said second air-operated diaphragm valve closed when the fluid to be sampled is contained in the non-pressurized liquid line so that a portion of the fluid to be sampled is trapped between the first air-operated diaphragm valve and the second air-operated diaphragm valve;

opening the third air-operated diaphragm valve or keeping the third air-operated diaphragm valve open by the second pneumatic valve supplying or removing pressurized air to the third air-operated diaphragm valve and at least a portion of the trapped portion of the fluid to be sampled enters the sample line;

closing the third air-operated diaphragm valve by the second pneumatic valve supplying or removing pressurized air to the third air-operated diaphragm valve; and opening the third pneumatic valve and the low-pressure air is injected into the sample line, wherein the low-pressure air injected into the sample line moves the portion of the fluid to be sampled in the sample line to the sample analysis device, wherein the third air-operated diaphragm valve is closed by the second pneumatic valve supplying or removing pressurized air to the third air-operated diaphragm valve before the third pneumatic valve is opened and the low-pressure air is injected into the sample line.

10. The method of claim 9, wherein the non-pressurized liquid line is part of a clean-in-place (CIP) skid.

11. The method of claim 9, wherein the first pneumatic valve, the second pneumatic valve, and the third pneumatic valve are controlled by a controller.

12. The method of claim 9, wherein an air compressor provides air to the first pneumatic valve, the second pneumatic valve, and the third pneumatic valve.

13. The method of claim 9, wherein the sample analysis device comprises a total organic carbon ("TOC") analyzer.

14. The method of claim 9, wherein the fluid to be sampled is cleaning effluent.

15. The method of claim 9, further comprising purging the sample line once the sample is obtained by the sample analysis device and analyzed or otherwise processed by opening the third pneumatic valve or having it remain open and the sample line is purged by air supplied by the third pneumatic valve.

16. The method of claim 9, wherein at least one of the sample analysis device or the sample line are validated prior to the transfer of the sample of the fluid to be sampled to the sample analysis device.

17. A method for sample transfer, the method comprising:
providing:
a non-pressurized liquid line, wherein the non-pressurized liquid line is configured to contain a fluid to be sampled;

a first air-operated diaphragm valve and a second air-operated diaphragm in the liquid line, wherein closing either the first air-operated diaphragm valve and/or the second air-operated diaphragm valve prevents flow of the fluid to be sampled through the non-pressurized liquid line;

a third air-operated diaphragm valve situated on a stub-out of the non-pressurized liquid line, wherein the stub-out is located between the first air-operated diaphragm valve and the second air-operated diaphragm valve;

a sample line having a first end and a second end, wherein the first end if connected to the third air-operated diaphragm valve and the second end is connected to a sample analysis device, wherein the sample line is configured to contain and transfer a sample of the fluid to be sampled to the sample analysis device;

a first pneumatic valve that controls air flow to the first air-operated diaphragm valve and the second air-operated diaphragm valve;

a second pneumatic valve that controls air flow to the third air-operated diaphragm valve; and a third pneumatic valve that controls low-pressure air injected into the sample line; and closing the first air-operated diaphragm valve and the second air-operated diaphragm valve by the first pneumatic valve supplying or removing pressurized air to the first air-operated diaphragm valve and the second air-operated diaphragm valve, said first air-operated diaphragm valve and said second air-operated diaphragm valve closed when the fluid to be sampled is contained in the non-pressurized liquid line so that a portion of the fluid to be sampled is trapped between the first air-operated diaphragm valve and the second air-operated diaphragm valve;

opening the third air-operated diaphragm valve or keeping the third air-operated diaphragm valve open by the second pneumatic valve supplying or removing pressurized air to the third air-operated diaphragm valve and at least a portion of the trapped portion of the fluid to be sampled enters the sample line;

closing the third air-operated diaphragm valve by the second pneumatic valve supplying or removing pressurized air to the third air-operated diaphragm valve; and opening the third pneumatic valve and the low-pressure air is injected into the sample line, wherein the low-pressure air injected into the sample line moves the portion of the fluid to be sampled in the sample line to the sample analysis device, wherein the first pneumatic valve and the second pneumatic valve are open, and the third pneumatic valve is closed during validation.

* * * * *